United States Patent [19]
Hoffman

[11] 3,823,473
[45] July 16, 1974

[54] BLADE ATTACHMENT MEANS FOR SABER SAW ASSEMBLY

[76] Inventor: Simon J. Hoffman, P.O. Box 748, Saratoga, Calif. 95070

[22] Filed: Apr. 20, 1973

[21] Appl. No.: 353,146

Related U.S. Application Data

[62] Division of Ser. No. 97,425, Nov. 9, 1970, Pat. No. 3,750,283.

[52] U.S. Cl................ 30/338, 30/339, 30/392, 83/750, 83/698, 279/97
[51] Int. Cl............................................. B27b 19/08
[58] Field of Search............ 30/223, 224, 329, 338, 30/339, 392, 394; 279/97, 76, 82, 80; 83/697, 698, 750

[56] References Cited
UNITED STATES PATENTS

| | | | |
|---|---|---|---|
| 104,613 | 6/1870 | Mason | 83/698 |
| 2,101,362 | 12/1937 | Davidson | 83/697 X |
| 2,895,514 | 7/1959 | Wright | 30/394 |
| 3,367,335 | 2/1968 | Ward et al. | 30/329 X |
| 3,583,716 | 6/1971 | Daniel, Jr. | 279/81 |

*Primary Examiner*—Roy Lake
*Assistant Examiner*—James F. Coan

[57] ABSTRACT

Means for attaching a saber saw blade to the reciprocating portion of a saber saw assembly, wherein the blade can be releasably secured to the reciprocating portion which has means biased in a manner to hold the blade in such position. A number of embodiments of the attachment means provide for quick coupling and release of a saber saw blade to the assembly. In one group of embodiments, a blade holding means utilizes a torsion spring and in a second group of embodiments, the attachment means utilizes a compression spring. The support for the attachment means can be provided with any one of a number of improved abutments for engaging a workpiece. The support can be provided with means for moving the blade in a direction away from the kerf in a workpiece.

1 Claim, 38 Drawing Figures

PATENTED JUL 16 1974 3,823,473

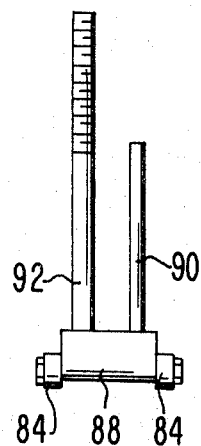
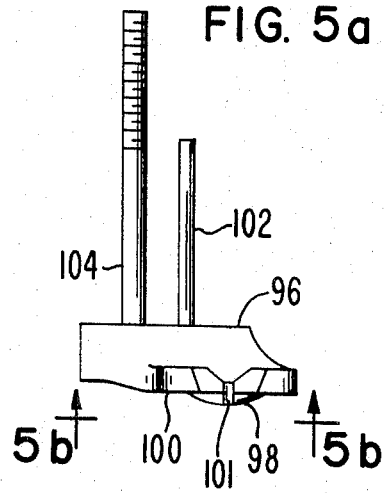
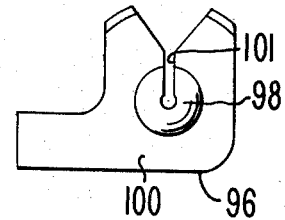
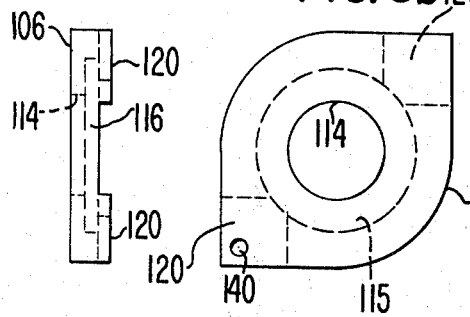
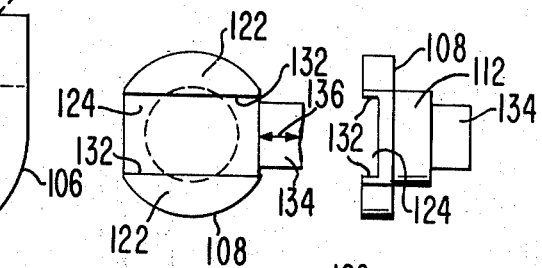
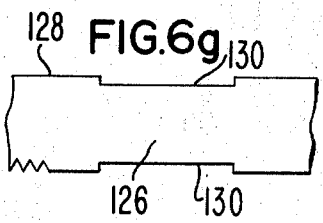
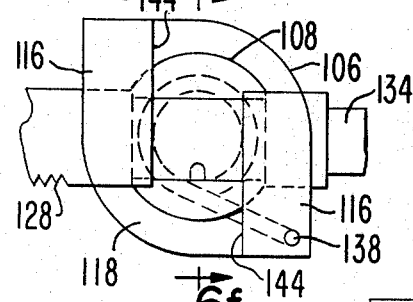
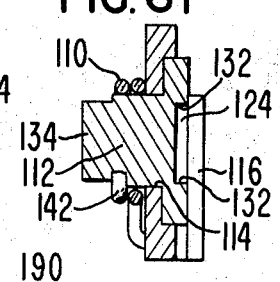
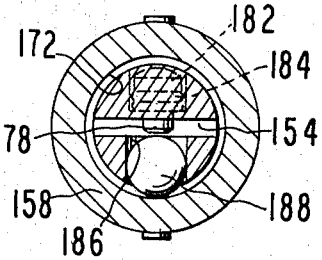
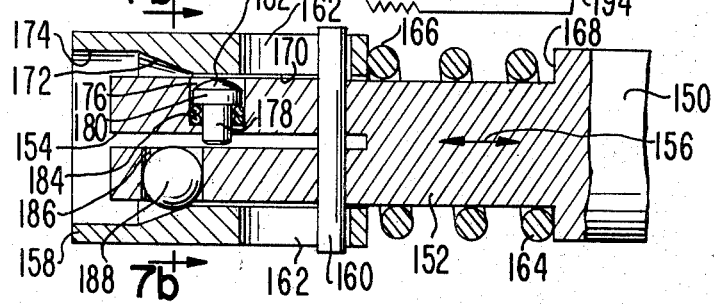

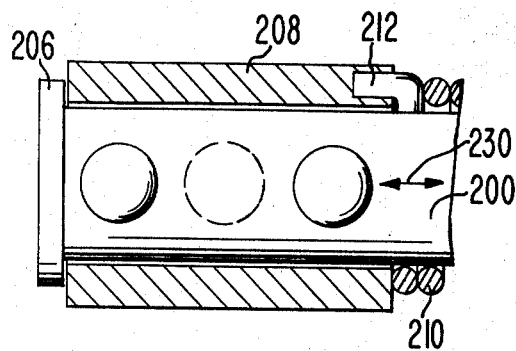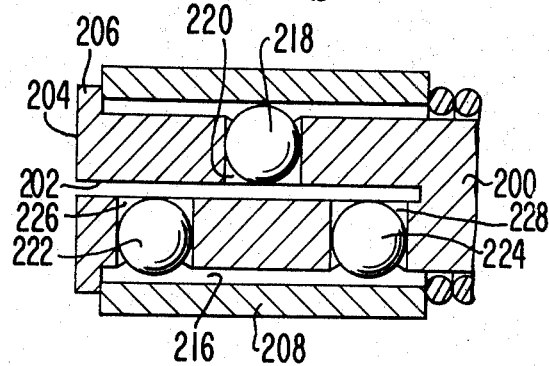

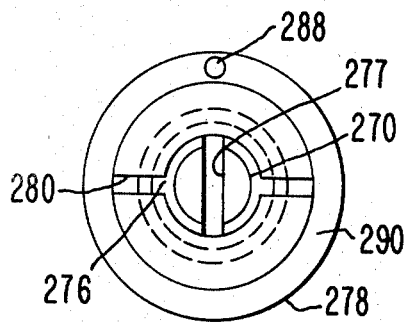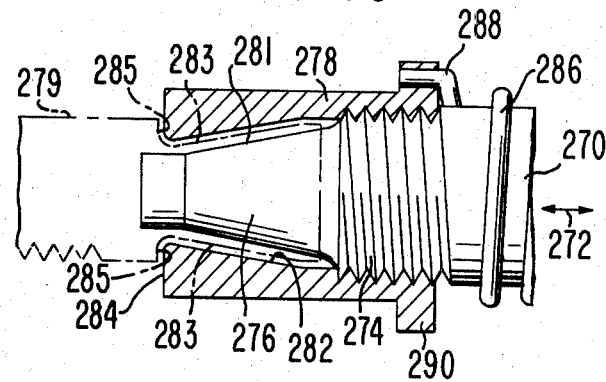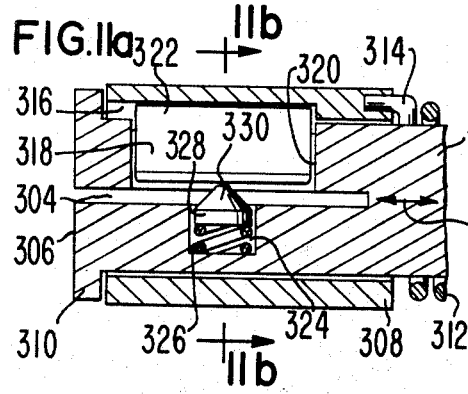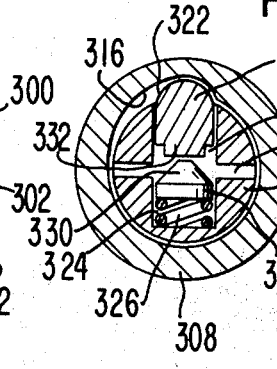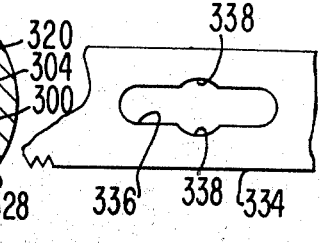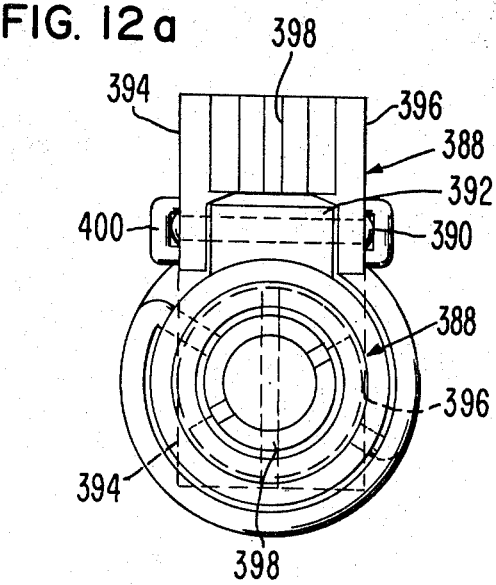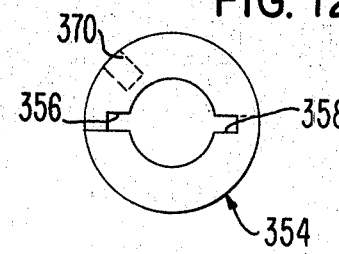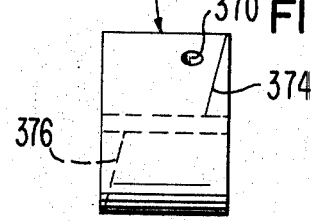

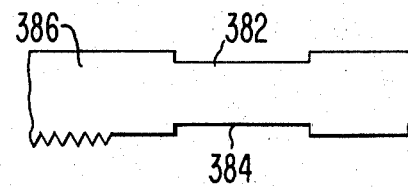
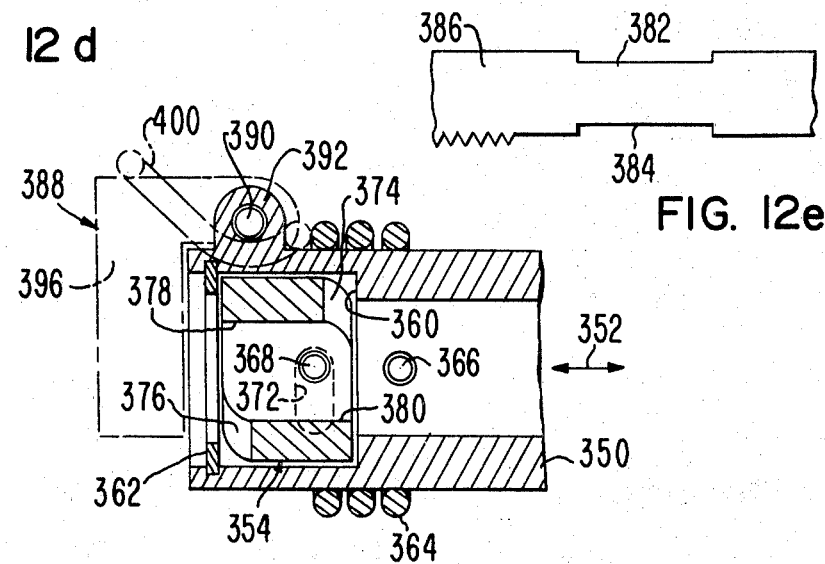
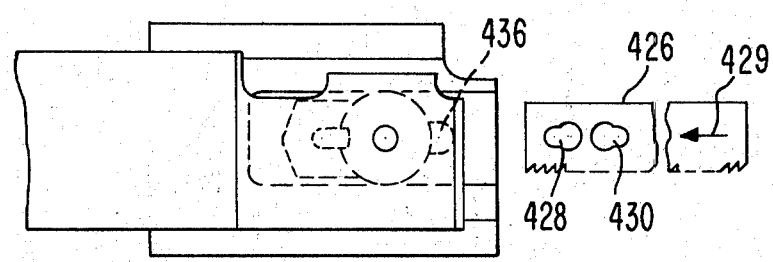
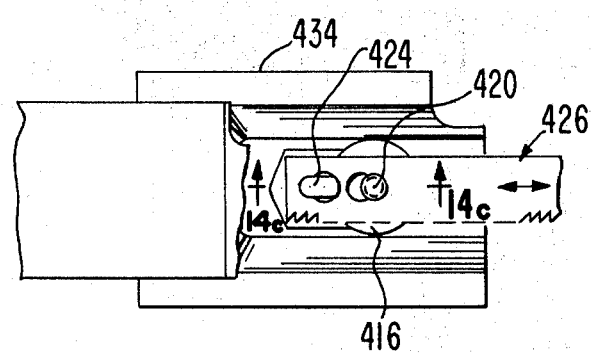
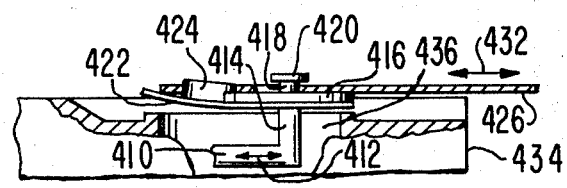

3,823,473

BLADE ATTACHMENT MEANS FOR SABER SAW ASSEMBLY

This is a division, of U.S. Pat. application Ser. No. 97,425, filed Nov. 9, 1970, now U.S. Pat. No. 3,750,283.

This invention relates to improvements in cutting devices of the type utilizing saber saw blades.

In forming a saber saw assembly, it is generally well known to utilize a conventional hand drill power source with an adaptor for changing the rotational motion of the chuck of the power source to translational or reciprocating motion so that a saber saw blade coupled with the adaptor can move in the desired manner. The way in which a saber saw blade is attached to the adaptor leaves much to be desired because conventional structures for accomplishing this purpose are quite complicated and are expensive to produce. Moreover, such structures are difficult to use, a factor which causes problems for hobbyists and others who may not have the dexterity required to connect a saber saw blade to such structures.

The present invention is directed to blade attachment means for an adaptor of the type utilized with a conventional hand drill power source wherein a saber saw blade can be quickly and easily connected to the adaptor in an operative position and then, after use, easily removed from the adaptor so that any individual having a minimum of skill with tools can use the saber saw blade in combination with the power drill device and the adaptor itself. The simplicity of the present invention eliminates the problems due to the complexity of the structures which have heretofore been used. The attachment means of the invention can be made from inexpensive materials, has a long operating life, and can be used with any adaptor so long as the latter has structure which reciprocates in the way in which a saber saw blade is normally to be used.

Another aspect of the invention is the provision of improved, interchangeable abutment means for the front end of the adaptor. One form of such abutment means allows for the adaptor to be set at any angle to the workpiece. Such feature allows the saber saw assembly to be quickly and easily used for mitering workpieces. Other forms of the abutment means include one in which rollers are used for rolling engagement with a workpiece during the cutting action of the saber saw blade attached to the adaptor, and one in which a spherical projection is adapted to surround the blade and to engage a workpiece at any one of a number of different angles so that the workpiece can still be cut even though it has an irregular outer surface.

Another feature of the invention includes a mounting for the blade attachment means wherein the path of the blade is at an angle with respect to the longitudinal axis of the blade itself. This feature assures that during a portion of each complete cycle of reciprocation of the blade, the cutting teeth of the blade will tend to move away from the kerf in the workpiece to thereby facilitate the cutting action.

The primary object of this invention is to provide improved blade attachment means for a saber saw assembly of the type utilizing a conventional hand drill power source and an adaptor connected thereto wherein the attachment means is simple and rugged in construction, utilizes spring means for biasing certain parts into positions wherein a saber saw blade is positively held for reciprocating movement, and the attachment means can be in any one of a number of different forms to accommodate certain blade configurations.

Another object of this invention is to provide improved abutment means for the front end of a saber saw assembly of the type described to facilitate the use of the assembly in cutting a workpiece of a particular configuration while at the same time, the various forms of the abutment can be utilized with any one of the embodiments of the attachment means of the invention.

Still another object of this invention is to provide an adaptor for an assembly of the aforesaid character wherein the adaptor has means for reciprocating a saber saw blade along a path which is at an acute angle with respect to the longitudinal axis of the blade so that during a portion of each reciprocating cycle of movement, the blade will tend to move out of the kerf of the workpiece being cut to facilitate the over-all cutting action of the blade and thereby prolong the useful life of the blade itself.

Other objects of this invention will become apparent as the following specification progresses, reference being had to the accompanying drawings for illustrations of several embodiments of the invention.

In the drawings:

FIG. 4a is a side elevational view of the abutment guide of FIG. 4 when the same is separated from the assembly;

FIG. 5a is a view similar to FIG. 4a but showing a third embodiment of an abutment;

FIG. 5b is a front elevational view of the abutment guide of FIG. 5a looking in the direction of line 5b—5b of FIG. 5a;

FIG. 6a is an end elevational view of one part of a first embodiment for the blade attachment means of this invention;

FIG. 6b is a side elevational view of the part of FIG. 6a;

FIG. 6c is a side elevational view of a second part of the embodiment utilizing the part shown in FIGS. 6a and 6b;

FIG. 6d is an end elevational view of the part of FIG. 6c;

FIG. 6e is a side elevational view of the first embodiment of the attachment means when the parts of FIGS. 6a–6d are assembled and a saber saw blade is connected thereto;

FIG. 6f is a cross-sectional view taken along lines 6f—6f of FIG. 6e, showing the torsion spring used with the assembly;

FIG. 6g is a fragmentary, side elevational view of a saber saw blade used with the assembly of FIG. 6e;

FIG. 7a is a cross-sectional view of a second embodiment of the blade attachment means utilizing a compression spring;

FIG. 7b is a cross-sectional view taken along line 7b—7b of FIG. 7a;

FIG. 7c is a fragmentary, side elevational view of an end portion of the saber saw blade used with the embodiment of FIGS. 7a and 7b;

FIG. 8a is a side elevational view, partly in section, of another embodiment of the attachment means utilizing a torsion spring;

FIG. 8b is a cross-sectional view of the embodiment of FIG. 8a;

FIG. 8c is another cross-sectional view of the embodiment of FIG. 8a looking in a direction at right angles to the view of FIG. 8b;

FIG. 9a is a side elevational view of another embodiment of the attachment means utilizing a compression spring;

FIG. 9b is a cross-sectional view taken along line 9b—9b of FIG. 9a;

FIG. 9c is a cross-sectional view taken along line 9c—9c of FIG. 9a;

FIG. 9d is a side elevational view of a portion of a saber saw blade to be utilized with the embodiment of FIGS. 9a–9c;

FIG. 10a is a side elevational view of one part of another embodiment of the attachment means utilizing a torsion spring;

FIG. 10b is an end elevational view of the part of FIG. 10a;

FIG. 10c is a cross-sectional view of the embodiment using the part of FIGS. 10a and 10b and showing a saber saw blade connected thereto;

FIG. 11a is a cross-sectional view of still another embodiment utilizing a torsion spring;

FIG. 11b is a cross-sectional view taken along line 11b—11b of FIG. 11a;

FIG. 11c is a fragmentary, side elevational view of the saber saw blade utilized with the embodiment of FIGS. 11a and 11b.

FIG. 12a is a front elevational view of a further embodiment of the attachment means utilizing a torsion spring;

FIG. 12b is an end elevational view of a part of the structure of FIG. 12a.

FIG. 12c is a side elevational view of the part of FIG. 12b;

FIG. 12d is a cross-sectional view of the attachment means of FIG. 12a;

FIG. 12e is a fragmentary, side elevational view of an end portion of a saber saw blade to be utilized with the embodiment of FIGS. 12a and 12b;

FIG. 13a is a side elevational view of another embodiment of the saber saw blade attachment means utilizing a leaf spring and showing the blade removed therefrom;

FIG. 13b is a view similar to FIG. 13a but showing the blade coupled to the attachment means; and FIG. 13c is a cross-sectional view of the attachment means of FIGS. 13a and 13b.

Figure 1:
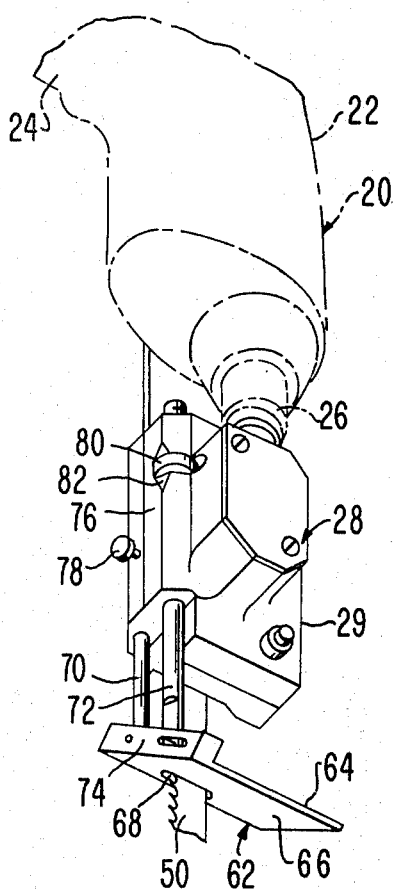
FIG. 1 is a perspective view of a saber saw assembly utilizing a conventional hand drill unit having an attachment for a saber saw blade to the hand drill unit, and illustrating an adjustable abutment plate on the front end of the assembly.

The various embodiments of the blade attachment means of this invention can be utilized with any suitable power device which has a reciprocating shaft or member. As will hereinafter be set forth, such embodiments will, for purposes of illustration, utilize a reciprocating shaft. The invention is suitable for use with a hand drill 20 of conventional construction and of the type shown in FIG. 1 wherein a housing 22 has a handle 24 and carries a motor (not shown) therewithin for rotating a drill chuck 26. A conventional drill, when coupled with chuck 26, is rotated thereby upon actuation of the drill motor as is well known.

Instead of using a drill, an adaptor 28 can be utilized with chuck 26 to convert rotational movement of the chuck into translational, reciprocatory movement. This reciprocating action is used to drive a saber saw blade coupled by an attachment means to adaptor 28.

Figure 2:
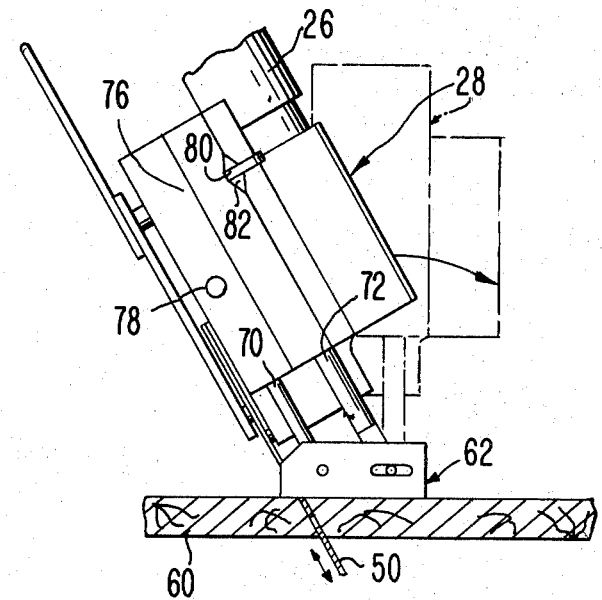
FIG. 2 is a side elevational view of the assembly of FIG. 1 showing the way the abutment plate rests on a workpiece to be cut.
Figure 3:
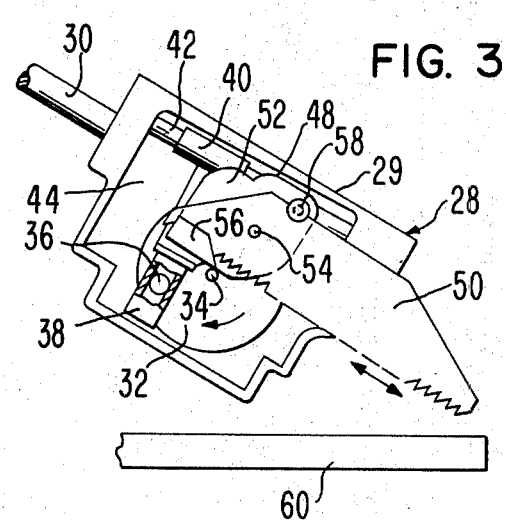
FIG. 3 is a side elevational view of one form of the attachment showing a mount for the blade to permit it to reciprocate.
Figure 4:
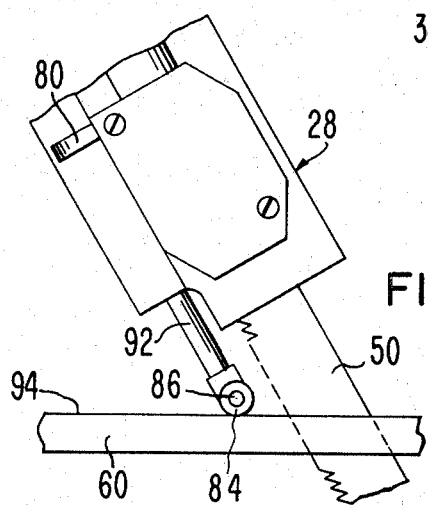
FIG. 4 is a view similar to FIG. 2 but showing a second embodiment of an abutment on the front end of the assembly.

Adaptor 28 may be of any construction but, for purposes of illustration only, it includes a housing 29 having a gear assembly (not shown) which is rotated when a shaft coupled with chuck 26 is rotated. One form of the adaptor is shown in FIGS. 1, 2 and 4 and a second, slightly different form of the adaptor is shown in FIG. 3. The essential difference between the two forms of adaptors is that one mounts a blade at one side and the other mounts a blade at the opposite side. In view of such slight difference, both forms will be described with reference to the same materials.

The rotation of the gear assembly within housing 29 causes rotation of a disk 32 on a shaft 34 (FIG. 3) disposed transversely of shaft 30. A pin 36 is radially, outwardly spaced from shaft 34 and is shiftably coupled with a channel-shaped member 38 secured to a sleeve 40 which is shiftably mounted on a rod 42 in a recess 44 in the housing 29 of adaptor 28. Thus, as shaft 30 is rotated by chuck 26, shaft 34 is caused to rotate to, in turn, cause rotation of pin 36. Member 38 is thus caused to reciprocate with respect to housing 29 and the blade attachment means 48 secured to member 38 causes a saber saw blade 50 to reciprocate with respect to adaptor 28.

The particular attachment means 48 shown in FIG. 3 includes a base member 52 having a flat side face and a central pin 54 projecting laterally from the side face, a flange 56 spaced laterally from the side face at a location near one margin of base member 52 to confine one edge of blade 50, and a second pin 58 near the margin of base member 52 opposite to the margin having flange 56. Blade 50 has a hole for receiving pin 54 and a recess for complemental engagement with pin 58. The blade thus can be secured to attachment means 48 and caused to reciprocate therewith relative to adaptor housing 29.

Attachment means 48 is constructed to position the longitudinal axis of blade 50 at an acute angle with respect to the longitudinal axis of rod 42. The angles are such that the rod and the blade diverge as the front end of housing 29 is approached (FIG. 3). In this way, the blade, as it reciprocates, will tend to move out of the kerf in a workpiece 60 as it moves forwardly of the adaptor. This will have the effect of clearing the workpiece during such forward movement so that, when the blade is moved rearwardly again, it properly engages the workpiece to cut the same.

Adaptor 28 can be provided with quick disconnect, interchangeable abutment means including a first shiftable abutment 62 for engaging a workpiece in the manner shown in FIGS. 1 and 2 when it is desired to miter the workpiece or otherwise cut the same at an angle. Abutment 62 includes a plate-like member 64 having a flat surface 66 for engaging the workpiece, the surface having a slot 68 through which blade 50 extends.

A pair of rods 70 and 72 are pivotally secured to the base 74 of member 64 and are shiftably received within parallel bores in a boss 76 on housing 46. Rod 72 is externally threaded and coupled to a nut 80 received within a notch 82 which intersects the bore which receives rod 72. Thus, by rotating nut 80 in the proper direction, rod 72 can be caused to move further inwardly or outwardly of the bore as rod 70 is held by set screw 78. Since rods 70 and 72 are pivotally coupled with base 74, the angularity of member 64 can thereby be varied with respect to blade 50.

FIG. 2 illustrates two operative positions of adaptor 28. One position, shown in full lines, illustrates member 64 at an angle with respect to the workpiece so that blade 50 can provide a mitering effect. The second position, shown in dashed lines, illustrates how blade 50 is perpendicular to the workpiece.

Another embodiment of the abutment is shown in FIGS. 4 and 4a and includes a pair of workpiece-engaging rollers 84 mounted on opposite ends of a shaft 86 carried by a base 88 to which is secured a pair of rods 90 and 92, the latter rod being externally threaded. The two rods are adapted to be shiftably received within the two bores of boss 76. Nut 80 is adapted to become threadably connected with rod 92 in the manner described above with respect to abutment 62 so that both rods 90 and 92 are secured to boss 76. Rollers 84 roll over the upper surface 94 of a workpiece 60 as blade 50 cuts through the workpiece. The rollers thereby provide a means by which a saber saw blade assembly is supported for movement with minimum friction over a workpiece as the blade of the assembly cuts the workpiece.

Another embodiment of an abutment is shown in FIGS. 5a and 5b and includes a base 96 in the form of a shield having a workpiece-engaging projection 98 on the front face 100 thereof. A slot 102 through base 96 is provided to permit blade 50 to extend therethrough. Projection 98 has a spherical outer surface so that the abutment can be used for rough cutting within an 180 degree arc while keeping the abutment close to the working portion of the blade without blade breakage. Thus, the abutment can engage the irregular outer surface of a particular type of workpiece to thereby support the saber saw assembly as the blade of the assembly cuts the workpiece.

The abutment of FIGS. 5a and 5b is secured to adaptor 28 in the same manner as the abutment of FIGS. 4 and 4a. To this end, a pair of rods 102 and 104 are secured to base 96 and extend laterally therefrom. Rod 102 is adapted to be secured in place by set screw 78 and rod 104 is externally threaded so that it can become coupled with nut 80. This construction permits the adjustability of base 96 with respect to the front end of adaptor 28.

Another embodiment of the blade attachment means of this invention is illustrated in FIGS. 6a–6f and includes a first member 106, a second member 108, and a torsion spring 110 in the form of a coil surrounding a lateral projection 112 rigid to member 108 (FIG. 6f). Member 106 has a central opening 114 therethrough for receiving projection 112 as shown in FIG. 6f so that member 106 can rotate to a limited extend on member 108. An annular countersunk region 115 in member 106 surrounding opening 114 complementally receives member 108, the latter having opposed arcuate edges as shown in FIG. 6c. A pair of retainer strips 116 are secured to member 106 and are spaced apart as shown in FIG. 6e. Strips 116 are spaced from the flat face 118 of member 106 by generally rectangular bosses 120. Also, the inner surfaces of strips 116 are in sliding engagement with the flat faces 122 of member 108, the latter having a recess 124 as shown in FIGS. 6c and 6f, for receiving the portion 126 of a saber saw blade 128 with portion 126 being between opposed recesses or notches 130 in the edge margins of the blade.

Recess 124 of member 108 presents a pair of side faces 132 (FIGS. 6c and 6f) which mate with recesses 130 of blade 128 whereby the blade is coupled with member 108 and held thereby against movement in the direction of the longitudinal axis of the blade. FIG. 6e illustrates blade 128 coupled to the attachment means including parts 106 and 108 wherein the blade is held against lateral movement outwardly from faces 122 of member 108 by retainer strips 116.

Member 108 has a shaft or member 134 which reciprocates in the direction of arrow 136 (FIG. 6c). Shaft 134 is coupled in any suitable manner to projection 112 and is adapted to be coupled in any suitable manner to a power drive such as to channel member 38 or sleeve 40 (FIG. 3) of adaptor 28.

Coil spring 110 surrounds projection 112 and has one end 138 coupled with member 106 through a hole 140 (FIG. 6b). The opposite end 142 of the spring is received within a bore in projection 112 (FIG. 6f). The spring biases member 106 in a counterclockwise sense relative to member 108 when viewing FIG. 6e. Thus, the spring normally has a restoring force in the form of a torque on member 106.

In use, blade 128 is coupled with the attachment means shown in FIG. 6e by rotating member 106 in a counterclockwise sense until the edges 144 of retainer strips 116 (FIG. 6e) are essentially parallel with side faces 132 of recess 124 (FIGS. 6c, 6d and 6f). The spacing between edges 144 then permits blade 128 to be moved into recess 124 so that side faces 132 complementally engage within recesses 130 of blade 128.

Then, member 106 is released, causing spring 110 to rotate member 106 in a counterclockwise sense when viewing FIG. 6e. When this occurs, retainer strips 116 move into the full line positions of FIG. 6e wherein they confine the blade against movement laterally of and outwardly from recess 124. Thus, the blade is releasably coupled to member 108 and will reciprocate therewith upon reciprocation of shaft 134. The blade is removed by reversing the above process.

Another embodiment of the blade attachment means is shown in FIGS. 7a and 7b and includes a shaft 150 having an extension 152 provided with a blade-receiving slot 154 in the outer end thereof. Shaft 150 is adapted to be secured in any suitable manner to a power device so that the shaft can reciprocate in the direction of arrow 156 (FIG. 7a). Thus, shaft 150 could, for example, be coupled with channel member 38 or sleeve 40 of FIG. 3.

A sleeve 158 surrounds extension 152 and is coupled thereto by a pin 160 which is transverse to the longitudinal axis of extension 152 and projects into diametrically opposed slots 162 in sleeve 158. A coil spring 164 surrounds extension 152 and is under compression between one end face 166 of sleeve 158 and an annular shoulder 168 on shaft 150. The spring biases sleeve 158 to the left when viewing FIG. 7a.

Sleeve 158 has a first cylindrical surface 170 which is only slightly larger in diameter to the cylindrical outer surface of extension 152, a second doubled cam surface 172 which flairs outwardly as the outer end of the sleeve 158 is approached, and a third cylindrical surface 174 at the outer end of sleeve 158.

Extension 152 is provided with a first bore 176 which receives a pin 178 having a head 180 provided with a convex outer surface 182. The pin projects into slot 154 and is biased outwardly of the slot by a coil spring 184 surrounding the pin and disposed in bore 176.

Extension 152 has a second bore 186 into which is disposed a ball 188 capable of engaging a blade in slot 154 when sleeve 158 is in the position shown in FIG. 7a.

FIG. 7c illustrates an end portion of a blade 190 adapted for use with the attachment means of FIG. 7a. Blade 190 has a hole 192 therethrough for receiving pin 178 and a recess or notch 194 for complementarily receiving a portion of pin 160. Pin 178 and ball 188 are held in the position shown in FIG. 7a by surfaces 170 and 172, respectively, yet the pin and the ball can move outwardly of and laterally away from slot 154 when sleeve 158 is moved to the right when viewing FIG. 7a against the compression force of spring 164.

In use, sleeve 158 is first moved to the right when viewing FIG. 7a. This will position surface 172 in alignment with bore 176, thereby permitting pin 178 to move out of slot 154 under the influence of the bias force of spring 184. Similarly, ball 188 can move away from slot 154 since surface 172 will become more completely aligned with bore 186 then is shown in FIG. 7a.

Blade 190 is then inserted into slot 154 so that hole 192 is aligned with pin 178 and recess 194 receives pin 160. Then, sleeve 158 is released, whereupon surface 172 cams pin 178 inwardly with respect to slot 154 until surface 170 overlies head 180 as shown in FIG. 7a. Similarly, ball 188 is moved into frictional engagement with the opposite side of the blade. The blade is then held at least at two points, namely, at hole 192 and at recess 194. The blade cannot be removed from the slot nor can it move in the plane of the slot. Shaft 150 can then be reciprocated to, in turn, cause reciprocation of the blade in the slot. To remove the blade from the attachment means, the above steps are repeated.

Another embodiment of the attachment means utilizing the torsion principle is shown in FIGS. 8a–8c and includes a shaft 200 having a blade-receiving slot 202 extending inwardly from one end face 204 thereof. An annular flange 206 surrounding the entrance to slot 202 is used as an abutment for engaging one end of a sleeve 208 mounted on and surrounding shaft 200. A coil spring 210 surrounding shaft 200 has one end coupled to the shaft and the opposite end 212 secured in any suitable manner to sleeve 208. The spring is normally twisted so that it applies a torque to sleeve 208 in a counterclockwise direction when viewing FIG. 8c.

The inner surface of sleeve 208 has a pair of diametrically opposed cam surfaces 214 and 216 which extend axially of the sleeve. Surface 214 is adapted to engage a blade-holding member, such as a ball 218, carried in a bore 220 in shaft 200 (FIG. 8b). Surface 216 is adapted to engage a pair of spaced blade-holding members, such as balls 222 and 224, disposed in transverse bores 226 and 228, respectively, in shaft 200, bores 226 and 228 being staggered with respect to bore 220 as shown in FIG. 8b.

Shaft 200 is adapted to be secured to a power drive in a manner such that the shift is capable of reciprocating in the direction of arrow 230 (FIG. 8a). For example, shaft 200 may be coupled to channel member 38 or sleeve 40 of adaptor 28 shown in FIG. 3.

In use, sleeve 208 is rotated slightly so that the large diameter portions of surfaces 214 and 216 are aligned with the bores containing balls 218, 222 and 224. This will allow the blade-holding members to be moved a short distance in directions away from slot 202. A saber saw blade having recesses for at least partially receiving the balde-holding member is then inserted into slot 202 as sleeve 208 is held with surfaces 214 and 216 in the aforesaid positions. The blade is moved into the slot until it abuts the inner end of the slot. Thereupon, sleeve 208 is released, thereby returning surfaces 214 and 216 to the position shown in FIG. 8c. When this occurs, the surfaces cam the blade-holding members 218, 222 and 224 inwardly with respect to slot 202 so that such members at least partially enter respective recesses of the blade and hold the same against movement out of the slot. The width of the blade is essentially equal to the diameter of the cylindrical inner surface of sleeve 208 so that the sleeve confines the blade against any movement in the plane of slot 202 while the members substantially prevent any movement of the blade out of the slot. The blade is removed by reversing the above steps.

Another embodiment of the attachment means for a saber saw blade is shown in FIGS. 9a–9c and includes a shaft 240 adapted to be secured to a power device so that the shaft can reciprocate in the direction of arrow 242 (FIG. 9b). The shaft has a pair of spaced, parallel pins 244 secured thereto and projecting laterally therefrom. The outer ends of the pins are received within a groove 246 on the inner surface of a sleeve 248 which is biased to the left when viewing FIG. 9b by a coil spring 256 surrounding shaft 240 and being under compression. The sleeve is movable to the right against the bias force of spring 256 so that the outer ends of pins 244 can be exposed. In this way, a saber saw blade 258 having a pair of holes 260 therein can be coupled with pins 244.

To accommodate the end of blade 258, sleeve 248 has a transverse groove 261 (FIG. 9c) by means of which the end of the blade can project beyond the proximal end face of the sleeve.

In use, sleeve 248 is moved to the right when viewing FIG. 9b against the bias force of spring 256. When this occurs, the outer ends of pins 244 are exposed and blade 258 can be moved onto the pins with the pins being received within holes 260. Then, the sleeve is released and is allowed to move to the left when viewing FIG. 9b thereby releasably connecting the saber saw blade to pins 244. The blade cannot move off the pins in a direction axially of shaft 240. Also, the configuration of groove 261 prevents lateral movement of blade 258 axially of pins 244. To this end, the inner surface 262 forming the inner extremity of groove 261 is flat and complementarily engages the flat side of the blade, thereby preventing it from moving laterally of the adjacent side of shaft 240. When it is desired to remove the blade, the above steps are reversed.

Still another embodiment of the blade attachment means of this invention which utilizes the torsion principle is shown in FIGS. 10a–10c and includes a shaft 270 which is adapted to be coupled with a power drive in a manner such that the shaft is able to be reciprocated in the direction of arrow 272 (FIG. 10c).

Shaft 270 has an externally threaded cylindrical portion 274 and a conical portion 276 which decreases in diameter as the outer end of the shaft is approached. Portion 276 has a blade-receiving slot 277 therein, the slot being open at the end of the shaft so that the end 281 of a saber saw blade 279 can be inserted into slot 277. End 281 is provided with a pair of end marginal edges 283 (FIG. 10c) which have essentially the same taper as conical portions 276. Edges 283 also present a pair of shoulders 285 on blade 279.

A sleeve 278 is threadably coupled with cylindrical portion 274 for rotation relative to shaft 270. Sleeve 278 has a slot 280 (FIG. 10a) therein which is alignable with slot 277, whereby end 281 of blade 279 can be coupled to the shaft.

The inner surface 282 of sleeve 278 axially spaced from the internally threaded portion thereof is tapered so as to be complemental to the outer surface of conical portion 276 of shaft 270. Thus, the inner surface decreases in diameter as the annular end face 284 of sleeve 278 is approached.

A coil spring 286 surrounds shaft 270 and has an end 288 coupled in any suitable manner to an annular flange 290 on sleeve 278. The opposite end (not shown) of the spring is secured to the shaft in a manner such that the spring is under stress and biases sleeve 278 in a counterclockwise when viewing FIG. 10b. Normally, slot 280 is perpendicular to slot 277 as shown in FIG. 10b. Thus, the end 281 of blade 279 cannot be inserted into slot 277. Only when the slots are in alignment with each other, i.e., in the same plane, can a blade be inserted into or taken out of slot 277.

In use, sleeve 278 is rotated in a clockwise sense when viewing FIG. 10b to bring slot 280 into alignment with slot 277. Then, end 281 can be inserted into the slot so that end 281 of blade 279 is moved into the dashed line position thereof shown in FIG. 10c. Thereupon the sleeve 278 is released, returning it to the position shown in FIG. 10b. The inner surface 282 of sleeve 278 will then prevent end 281 from being removed from slot 277. In this way, blade 279 is releasably coupled to shaft 270.

A further embodiment of the blade attachment means of this invention utilizing the torsion principle is shown in FIGS. 11a and 11b and includes a shaft 300 which is adapted to be secured in any suitable manner to a power drive so that the shaft can be reciprocated in the direction of arrow 302 (FIG. 11a). The shaft has a blade-receiving slot 304 therein which is open at the forward end face 306 of the shaft. A sleeve 308 is rotatably mounted on the outer surface of the shaft and is confined thereon against movement to the left when viewing FIG. 11a by an annular flange 310 integral with shaft 300. A coil spring 312 has one end 314 secured to the sleeve and the opposite end (not shown) secured to the shaft. The spring is under stress and biases sleeve 308 in a clockwise direction when viewing FIG. 11b.

Sleeve 308 has an internal cam surface 316 which normally engages an elongated retainer element 318 shiftably received within a bore 320 extending transversely of and communicating with slot 304. Element 318 has a convex outer surface 322 which engages cam surface 316. The remainder of the interior of sleeve 308 is generally cylindrical so as to be complemental to the outer surface of shaft 300.

The shaft has a second bore 324 on the opposite side of slot 304. A coil spring 326 and a guide member 328 are disposed within bore 324. The tip 330 of member 328 extends across slot 304 when there is no blade in the slot. However, the tip 330 is conical so that a blade inserted into slot 304 will force member 328 inwardly of bore 324 against spring 326, thereby compressing the spring and thereby allowing tip 330 to move out of the slot 304 and into bore 324. Normally, however, cam surface 316, under the influence of spring 312, biases element 318 so that the inner end portion 332 thereof is received within slot 304. Thus, portion 332 normally engages tip 330 and biases the latter into bore 324 since spring 326 has a smaller restoring force than spring 312.

FIG. 11c illustrates a portion of a saber saw blade 334 for use with the attachment means of FIG. 11a. Blade 334 has an opening 336 therethrough which is elongated and is substantially complemental with portion 332 of element 318 except for a pair of arcuate portions 338 at the center of opening 336 and the opposite sides thereof.

In use, sleeve 308 is rotated in a clockwise sense against the bias force of spring 312 until the sleeve is in the position shown in FIG. 11b. This will allow spring 326 to bias member 328 out of bore 324 to, in turn, cause tip 330 to engage portion 332 and force element 318 in a direction out of slot 304. Blade 334 is then inserted into the slot and the conical configuration of tip 330 allows the blade to urge the tip into bore 324 as the blade holds element 318 away from slot 304. The slot is inserted far enough so that member 328 is received in the central part of opening 336 so that member 328 serves to position the blade so that it can readily receive portion 332 of element 318 in opening 336 when sleeve 308 is released. When the blade is so positioned, the sleeve is released, whereupon spring 312 rotates the sleeve in a clockwise sense when viewing FIG. 11b. Cam surface 316 then urges element 318 radially inwardly, causing portion 332 to enter opening 336 of blade 334. Member 328 once again moves into bore 324 and compresses spring 326. In this way, the blade is releasably connected to shaft 300 and is prevented from moving out of slot 304. To remove the blade, the aforesaid steps are reversed.

Another embodiment of the blade attachment means utilizing the torsion principle is shown in FIGS. 12a–12d and includes a tubular shaft 350 which is secured to a power drive in a manner such that the shaft can be reciprocated in the direction of arrow 352 (FIG. 12d). The shaft has a countersunk portion at the outer end thereof for receiving a sleeve-like member 354 having a pair of diametrically opposed grooves 356 and 358 on the inner surface thereof (FIG. 12b). Member 354 is disposed within the countersunk end portion of shaft 350 and engages the annular shoulder 360 of shaft 350 which limits the inward travel of member 354. A resilient retaining ring 362 releasably holds member 354 within shaft 350.

A coil spring 364 has one end 366 received within a hole in the side of shaft 350. The opposite end 369 of spring 364 is received within a hole 370 in the side of member 354. End 368 also extends through a circumferential slot 372 in shaft 350 whereby member 354 can rotate to a limited extent about the axis of shaft 350. Spring 364 is normally under stress so that member 354 is biased in a clockwise sense when viewing FIG. 12a.

Member 354 has an inclined surface portion 374 at one end face thereof and an inclined surface portion 376 at the opposite end face. These surface portions terminate at respective grooves 356 and 358 to present respective projections 378 and 380 which are adapted to be received within respective recesses 382 and 384 at the opposed side edges of a saber saw blade 386 (FIG. 12e) when the blade, after being received within grooves 356 and 358, is rotated about an axis coincident with the axis of member 354. In this way, the blade becomes coupled with member 354 and cannot move axially of the same since the blade is then out of the plane in which grooves 356 and 358 are disposed.

A blade retaining element 388 is swingably mounted on shaft 350 by a pin 390 carried by a boss 392 rigid to the shaft at the end thereof, pin 390 being transverse to the axis of shaft 350 and disposed near the outer surface thereof.

Element 388 has a pair of sides 394 and 396 which are spaced apart to present a slot 398 therebetween. This slot is provided to allow blade 386 to pass therethrough while at the same time, sides 394 and 396 prevent rotation of the blade about the axis of shaft 350 when element 388 is in the dashed line position of FIGS. 12a and 12d. A spring 400 coupled with element 388 and with boss 392 biases element 388 in the dashed line position of FIGS. 12a and 12d.

In use, element 388 is first raised into the full line position of FIG. 12a and blade 386 is then inserted into member 354, specifically, into grooves 356 and 358 thereof. The blade is then rotated in a counterclockwise sense when viewing FIG. 12a until projections 378 and 380 are received within recesses 382 and 384 of blade 386. The projections frictionally engage the blade at the sides of respective recesses thereof and further rotation of the blade will tend to rotate member 354 through a small arc in a counterclockwise sense when viewing FIG. 12a against the bias force of spring 364. The blade is rotated until it is aligned with slot 398, thereupon, element 388 is moved into the dashed line position of FIGS. 12a and 12d, whereby the blade is received within slot 398 and sides 394 and 396 of element 388 hold the blade against rotational movement relative to shaft 350. Projections 378 and 380, in turn, prevent movement of the blade out of member 354. The blade can then be reciprocated with shaft 350. To remove the blade, the above steps are reversed.

Another embodiment of the blade attachment means of the invention is shown in FIGS. 13a–13c and includes a shaft 410 which is adapted to be reciprocated in the direction of arrow 412 (FIG. 13c). Shaft 410 can be coupled in any suitable manner to a power source to effect such reciprocation. For example, the shaft can be connected to sleeve 40 or channel member 38 of FIG. 3.

Shaft 410 has a projection 414 to which is secured a disk 416 having a pin 418 provided with a head 420 at the center of the disk. A leaf spring 422 which is curved in the manner shown in FIG. 13c is provided with a detent 424 near one end thereof, the detent being near the outer periphery of disk 416. As shown in FIG. 13a, the disk has a notch for receiving an end portion of the detent.

A blade 426 having a pair of openings 428 and 430 is adapted to be coupled with pin 418 and detent 424. Openings 428 and 430 are spaced apart by a distance such that, when the blade is coupled with the attachment means shown in FIG. 13b, pin 418 is at one end of opening 413 while the detent essentially fills opening 428. Thus, the blade is releasably secured to the pin and the detent and cannot move off the same until the detent is moved out of opening 428.

In use, blade 426 is moved in the direction of arrow 429 (FIG. 13a) onto disk 416. Head 420 initially passes through the enlarged part of opening 430 and continued movement of the blade will move pin 418 into the smaller portion of opening 430 as the blade deflects spring 422 to move detent 424 away from the blade. When pin 418 is aligned with the smaller portion of opening 430, detent 424 is aligned with opening 428. Spring 422 then moves the detent into opening 428 and head 420 prevents movement of blade 426 off pin 418.

To remove the blade, it is necessary to deflect spring 422 away from the blade to cause movement of the detent out of opening 428. The blade is then moved to the right when viewing FIG. 13b so that head 420 becomes aligned with the larger portion of opening 430 of the blade. The blade can then be moved away from disk 416 and off pin 418.

When the blade is attached as shown in FIGS. 13b and 13c, shaft 410 reciprocates to, in turn, reciprocate blade 426 in the direction of arrow 432. Shaft 410 is coupled to a support 434 having a slot 436 therein through which projection 414 extends.

In the claims:
1. In a saber saw assembly for use with a saw blade having a pair of longitudinally spaced holes therethrough near one end portion thereof: a member adapted to be reciprocated along a straight-line path; a pair of longitudinally spaced pins projecting outwardly from one side of the member, said pins adapted to be inserted in the holes of the blade for coupling said one end portion of said blade thereto; a sleeve carried by the member for longitudinal movement into and out of a blade-holding position and having groove means therein for receiving and holding said end portion of the blade on the pins; and means biasing said holding means into said blade-holding position thereof.

* * * * *